(12) United States Patent
Lim

(10) Patent No.: US 9,189,023 B2
(45) Date of Patent: Nov. 17, 2015

(54) WEARABLE ELECTRONIC DEVICE

(71) Applicant: Cheng Uei Precision Industry Co., Ltd., New Taipei (TW)

(72) Inventor: Chang Huat Lim, New Taipei (TW)

(73) Assignee: Cheng Uei Precision Industry Co., Ltd., New Taipei (TW)

( * ) Notice: Subject to any disclaimer, the term of this patent is extended or adjusted under 35 U.S.C. 154(b) by 70 days.

(21) Appl. No.: 14/187,096

(22) Filed: Feb. 21, 2014

(65) Prior Publication Data

US 2015/0241911 A1 Aug. 27, 2015

(51) Int. Cl.
*H05K 5/00* (2006.01)
*G06F 1/16* (2006.01)
*G06F 1/18* (2006.01)

(52) U.S. Cl.
CPC .............. *G06F 1/163* (2013.01); *G06F 1/1635* (2013.01); *G06F 1/188* (2013.01)

(58) Field of Classification Search
CPC ......... G06F 1/163; G06F 1/26; G04G 17/083; A45F 2200/0508; A45F 3/14
See application file for complete search history.

(56) References Cited

U.S. PATENT DOCUMENTS 6,549,791 B1 * 4/2003 Jeon et al. ..................... 455/572

* cited by examiner

*Primary Examiner* — Robert J Hoffberg
*Assistant Examiner* — Hung Dang
(74) *Attorney, Agent, or Firm* — Lin & Associates Intellectual Property, Inc.

(57) ABSTRACT

A wearable electronic device includes an electronic assembly and at least one detachable power supply strap. The electronic assembly includes a first main body, a circuit module, a first buckling device and a first connector. The circuit module is disposed inside the first main body. The first buckling device and the first connector are disposed outside the first main body. The first connector is electrically connected with the circuit module. The power supply strap mounted to one end of the electronic assembly includes a second main body, a second battery module disposed inside the second main body, a second connector and a second buckling device matchable with the first buckling device. The second connector and the second buckling device are disposed to one end of the second main body. The second connector is electrically connected with the second battery module and is connected with the first connector.

13 Claims, 5 Drawing Sheets

WEARABLE ELECTRONIC DEVICE

BACKGROUND OF THE INVENTION

1. Field of the Invention

The present invention generally relates to a wearable electronic device, and more particularly to a wearable electronic device having a power supply strap.

2. The Related Art

With electronic products becoming smaller and smaller, a variety of wearable electronic devices are increased day by day, such as intelligent watches, global positioning system (GPS) devices, heart rate monitors and intelligent glasses. The wearable electronic device is worn on a human body of a person by a holding device to bring a great convenience for the person who wears the wearable electronic device via various functions. The wearable electronic device generally includes a battery module. In order to realize a utility and beautiful effect of the wearable electronic device, a size of the wearable electronic device is limited, so a space of the wearable electronic device for accommodating the battery module is decreased, and accordingly a volume of the battery module need be decreased that shortens using time of the wearable electronic device. Thus, the battery module accommodated in the wearable electronic device need be charged frequently to cause an inconvenience in use.

A current intelligent watch includes an electronic meter, and two power supply straps disposed to two opposite sides of the electronic meter. In order to increase a charge capacity, each power supply strap is equipped with at least one battery. The power supply straps are electrically connected with the electronic meter for increasing the charge capacity.

However, when the battery module of the power supply strap need be charged, the electronic meter must be connected to a power supply that limits a using scope of the wearable electronic device which is the intelligent watch.

In order to overcome the above-mentioned drawbacks of the wearable electronic device, an innovative wearable electronic device need be provided for decreasing charging times and being charged quickly to bring a convenience in use and make the using scope of the wearable electronic device have no limitation.

SUMMARY OF THE INVENTION

An object of the present invention is to provide a wearable electronic device. The wearable electronic device includes an electronic assembly and at least one detachable power supply strap. The electronic assembly includes a first main body, a circuit module, a first buckling device and a first connector. The circuit module is disposed inside the first main body of the electronic assembly. The first buckling device and the first connector are disposed outside the first main body of the electronic assembly and located at one end of the electronic assembly. The first connector is electrically connected with the circuit module. The power supply strap is mounted to one end of the electronic assembly. The power supply strap includes a second main body, a second battery module, a second connector and a second buckling device. The second battery module is disposed inside the second main body of the power supply strap. The second connector and the second buckling device are disposed to one end of the second main body of the power supply strap. The second connector is electrically connected with the second battery module and is connected with the first connector. The second buckling device is matchable with the first buckling device.

As described above, the electronic assembly is charged by the way of being provided the power by the power supply strap, and the power supply stray is capable of being detached quickly and electrically connected with the electronic assembly by virtue of the first connector, the second connector, the first buckling device and the second buckling device, so that an using scope of the wearable electronic device will be without limitation. The wearable electronic device is capable of being charged by virtue of the first connector of the electronic assembly being electrically connected with the second connector having the same connector type as the first connector. In addition, the power supply strap is able to be replaced by another power supply ribbon-shaped element. Thus, the wearable electronic device can not only be worn on the wrist of the person, but also be worn to any part of a human body of a person.

BRIEF DESCRIPTION OF THE DRAWINGS

The present invention will be apparent to those skilled in the art by reading the following description, with reference to the attached drawings, in which.

DETAILED DESCRIPTION OF THE EMBODIMENT

Figure 1:
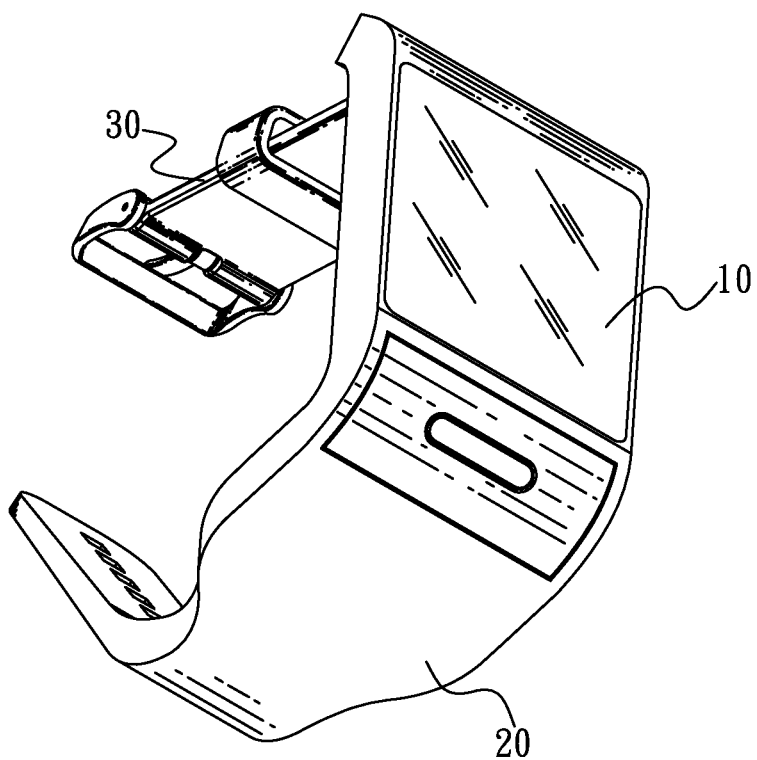
FIG. 1 is a perspective view of a wearable electronic device according to an embodiment of the present invention.

Referring to FIG. 1, a wearable electronic device 1 in accordance with an embodiment of the present invention is shown. The wearable electronic device 1 worn to a human body of a person includes an electronic assembly 10, at least one detachable power supply strap 20 and a main strap 30. The power supply strap 20 and the main strap 30 are mounted to two opposite ends of the electronic assembly 10 for fastening the electronic assembly 10 to the human body of the person. The electronic assembly 10 is a GPS device, a heart rate monitor or others. In this embodiment, the electronic assembly 10 is an intelligent terminal device. The power supply strap 20 is electrically connected with the electronic assembly 10.

Figure 2:
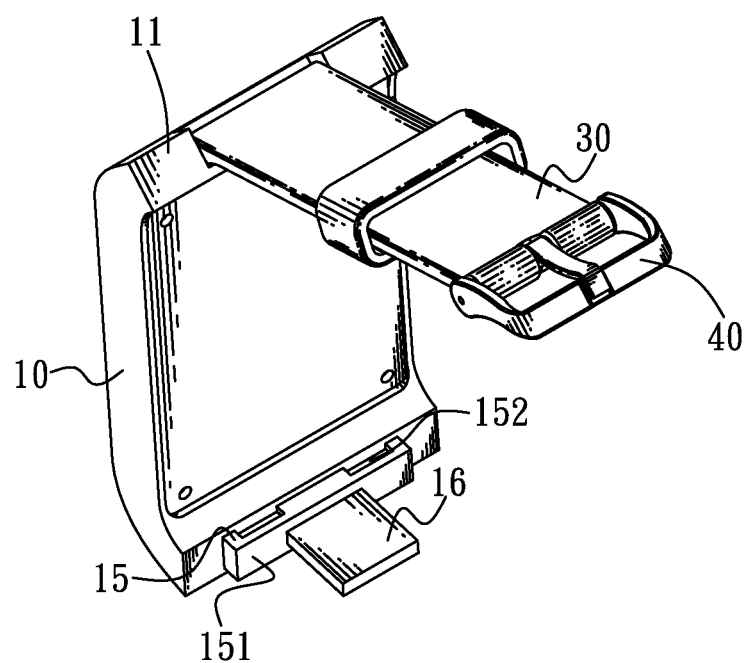
FIG. 2 is another perspective view of the wearable electronic device of FIG. 1.
Figure 3:
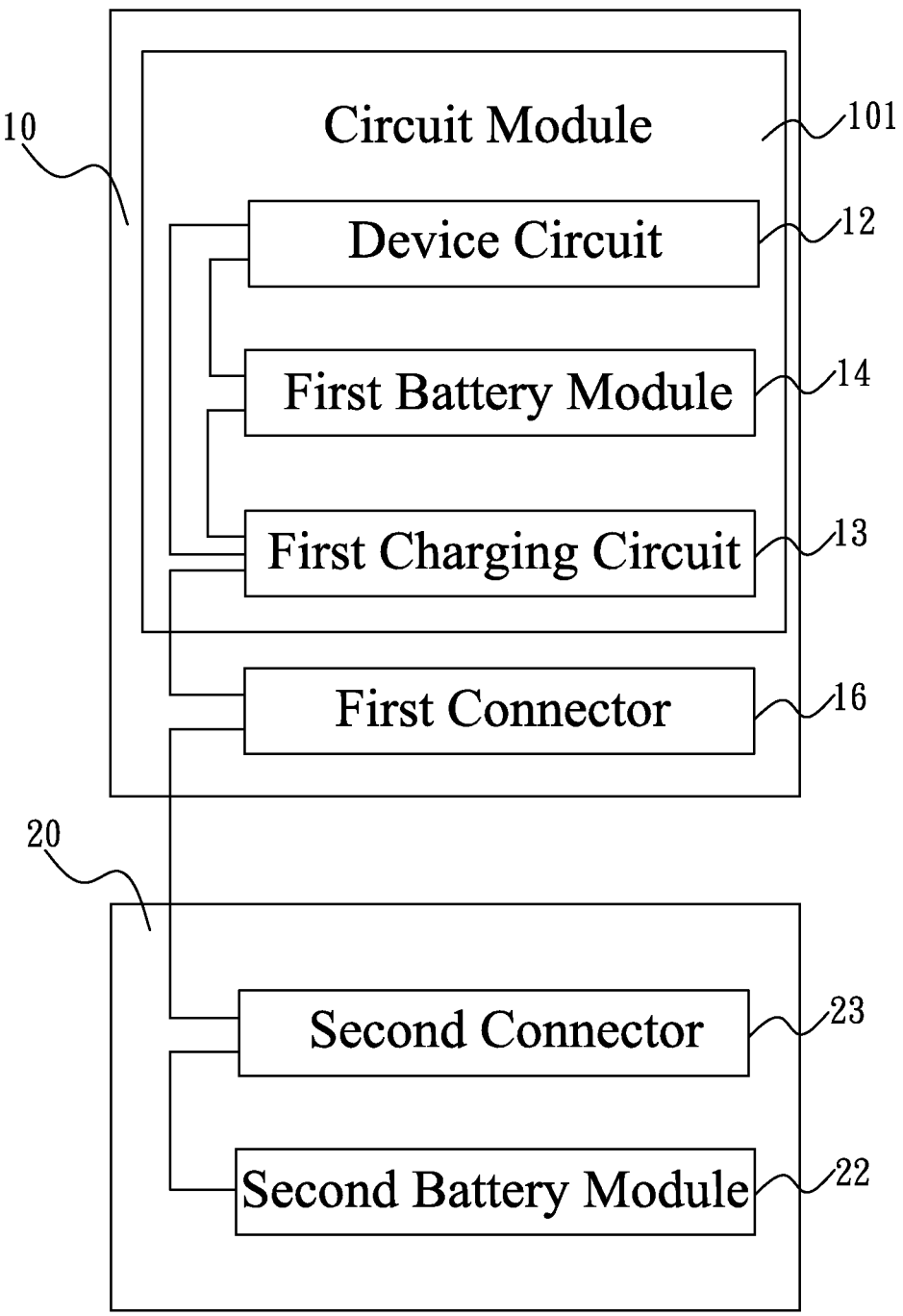
FIG. 3 is a circuit block diagram of the wearable electronic device of FIG. 1.

Referring to FIG. 2 and FIG. 3, the electronic assembly 10 includes a first main body 11, a device circuit 12, a first charging circuit 13, a first battery module 14, a first buckling device 15 and a first connector 16. The device circuit 12, the first charging circuit 13 and the first battery module 14 are disposed inside the first main body 11 of the electronic assembly 10, and are electrically connected with one another to form a circuit module 101 disposed inside the first main body 11 of the electronic assembly 10 for providing an operation function of the electronic assembly 10. The first buckling device 15 and the first connector 16 are disposed outside the first main body 11 of the electronic assembly 10 and located at one end of the electronic assembly 10. The first connector 16 is electrically connected with the first charging circuit 13 of the circuit module 101. In this embodiment, the first connector 16 is a plug connector. The device circuit 12 includes components (not shown) and electric circuits (not shown) needed by the electronic assembly 10 for working. In practice, the first charging circuit 13 or the first battery module 14 is able to be omitted in the circuit module 101 or replaced by other circuit unit.

Figure 4:
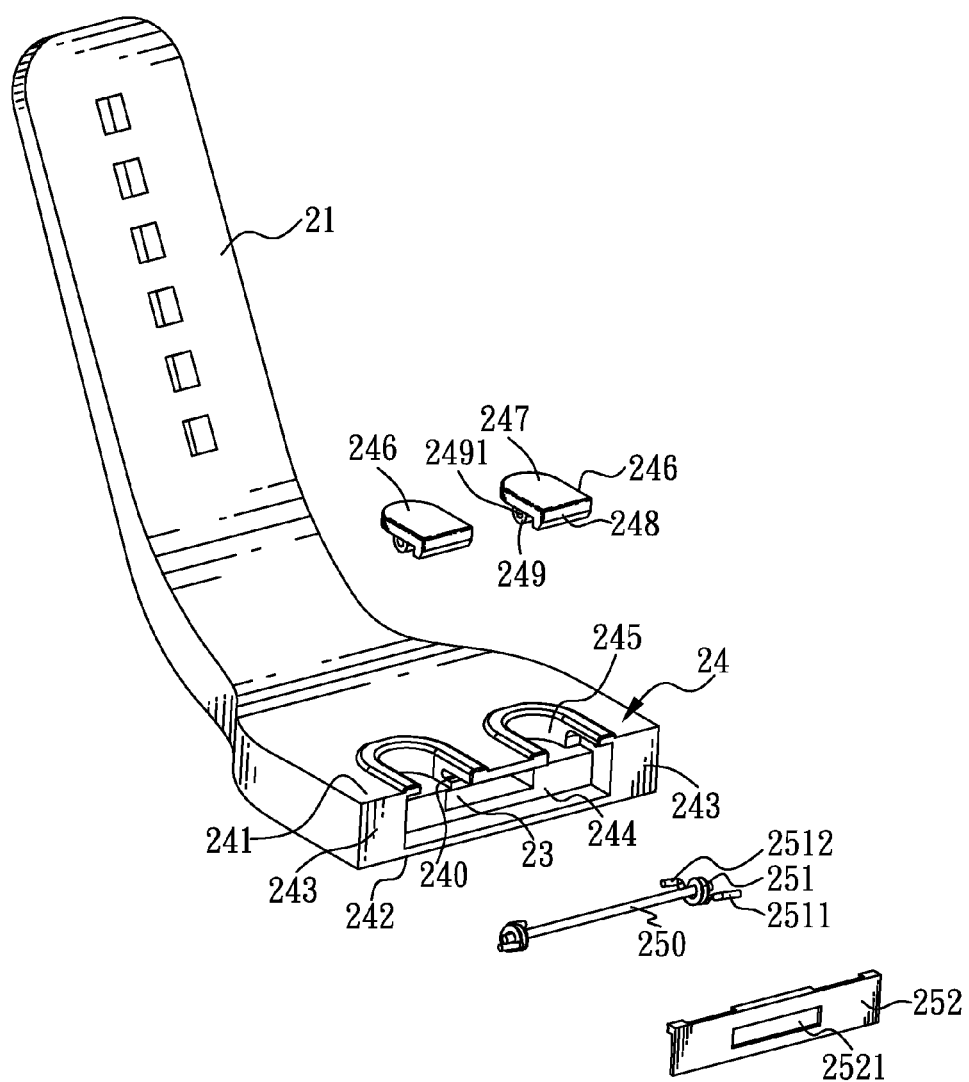
FIG. 4 is an exploded view of a power supply strap of the wearable electronic device of FIG. 1.

Referring to FIG. 2, FIG. 3 and FIG. 4, the power supply strap 20 of substantially flat ribbon shape is mounted to one end of the electronic assembly 10. The power supply strap 20 includes a second main body 21, a second battery module 22, a second connector 23 and a second buckling device 24. The second battery module 22 is disposed inside the second main body 21 of the power supply strap 20. The second connector 23 and the second buckling device 24 are disposed to one end of the second main body 21 of the power supply strap 20 for being mounted to the electronic assembly 10. In this embodiment, the second connector 23 is a receptacle connector and penetrates through an outer surface of the end of the second main body 21 of the power supply strap 20 for being mounted to the electronic assembly 10. The second connector 23 is electrically connected with the second battery module 22 and is connected with the first connector 16. The second buckling device 24 is matchable with the first buckling device 15. In this embodiment, the second buckling device 24 is buckled in the first buckling device 15. A second charging circuit of the second battery module 22 is able to be disposed inside the second main body 21 of the power supply strap 20 or disposed to a power cable for providing power to the second battery module 22.

Referring to FIG. 1 and FIG. 2, the main strap 30 is pivotally disposed to the other end of the electronic assembly 10, and the main strap 30 is connected with the power supply strap 20 by virtue of a clasp 40. In other embodiment, the main strap 30 is able to be replaced by the power supply strap 20.

Figure 5:
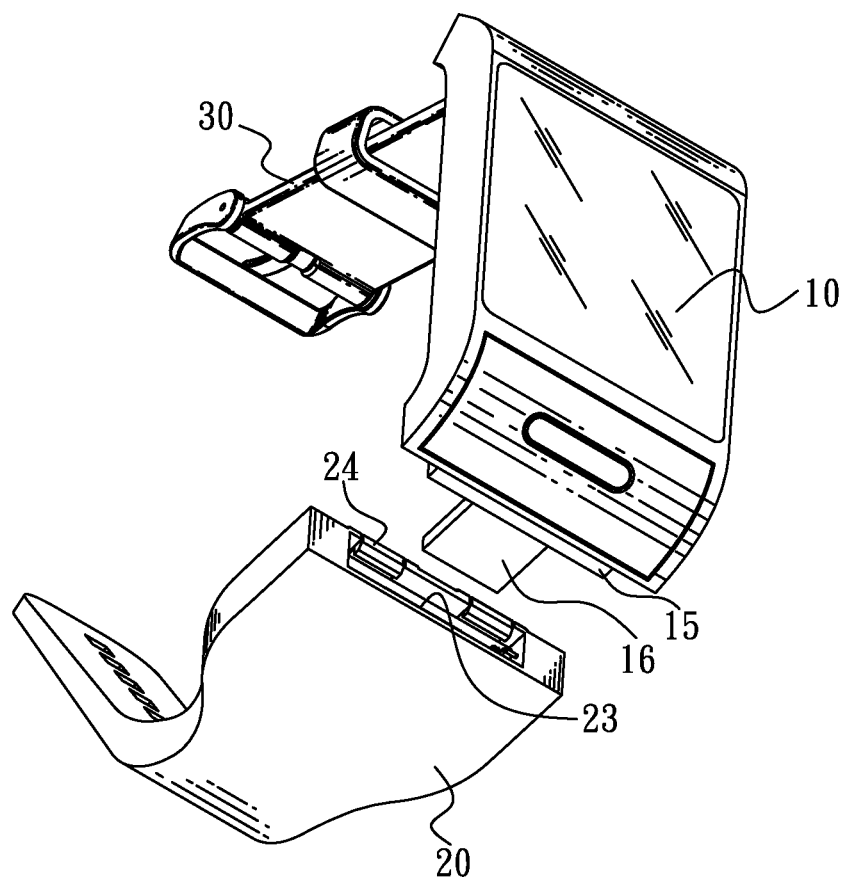
FIG. 5 is a perspective view of the wearable electronic device of FIG. 1, wherein an electronic assembly of the wearable electronic device is separated from the power supply strap.

Referring to FIG. 1, FIG. 3 and FIG. 5, after the first connector 16 is connected with the second connector 23, the second battery module 22 provides the power to the electronic assembly 10 by virtue of the first charging circuit 13, at the moment, if a power force of the first battery module 14 is insufficient, the second battery module 22 provides the power to the first battery module 14 by virtue of the first charging circuit 13. When the second battery module 22 has no way to provide the power or the first connector 16 is pulled out of the second connector 23, the electronic assembly 10 is provided the power by the first battery module 14.

Referring to FIG. 2, specifically, the first buckling device 15 includes a rectangular connecting block 151 protruded perpendicular to an end surface of the other end of the first main body 11 opposite to the end of the first main body 11 where the main strap 30 is pivotally disposed. The connecting block 151 defines at least one buckling hole 152. The first connector 16 is disposed to an outer surface of a free end of the connecting block 151 of the first buckling device 15. In this embodiment, two opposite sides of the connecting block 151 are concaved downward to form two buckling holes 152.

Referring to FIG. 2, FIG. 4 and FIG. 5, the second buckling device 24 includes a top wall 241 extended outward from a top of the one end of the second main body 21 of the power supply strap 20 for being mounted to the electronic assembly 10, a bottom wall 242 extended outward form a bottom of the one end of the second main body 21, and two opposite side walls 243 extended outward from two opposite sides of the one end of the second main body 21 and connected with the top wall 241 and the bottom wall 242. The top wall 241, the bottom wall 242 and the two side walls 243 surround a receiving space 244 for receiving the connecting block 151 of the first buckling device 15. The second connector 23 communicates with the receiving space 244.

The top wall 241 of the second buckling device 24 defines at least one buckling groove 245 vertically penetrating therethrough and penetrating through an outer surface thereof, and the second buckling device 24 further includes at least one buckling element 246 buckled in the buckling groove 245. The buckling element 246 of the second buckling device 24 has a base portion 247, a buckling portion 248 extended downward from one end of the base portion 247, and a lying protruding pillar 249 protruded downward from a bottom surface of the base portion 247. The protruding pillar 249 defines a circular pivoting hole 2491. A lower portion of the top wall 241 of the second buckling device 24 is recessed inward to form a fastening slot 240 communicating with the buckling grooves 245. The buckling portion 248 of the second buckling device 24 is rotatably buckled in the buckling hole 152 of the first buckling device 15. In this embodiment, the top wall 241 defines two buckling grooves 245 vertically penetrating therethrough and penetrating through the outer surface thereof, and the second buckling device 24 includes two buckling elements 246. The two buckling grooves 245 are spaced from each other and communicate with the receiving space 244. The two buckling portions 248 of the second buckling device 24 of the second buckling device 24 are rotatably buckled in the two buckling holes 152 of the first buckling device 15.

The second buckling device 24 further includes a pivoting rod 250, two torsion springs 251 and an isolating piece 252. Two opposite ends of each torsion spring 251 respectively protrude outward to form a first abutting portion 2511 and a second abutting portion 2512. A middle of the isolating piece 252 defines an insertion hole 2521. The pivoting rod 250 passes through the pivoting hole 2491 of the protruding pillar 249 of the buckling element 246. The two torsion springs 251 are worn around two opposite ends of the pivoting rod 250, the pivoting rod 250 together with the two torsion springs 251 is fastened to the fastening slot 240, and the buckling element 246 is buckled in the buckling groove 245 so as to make the buckling portion 248 of the buckling element 246 rotate pivoting the pivoting rod 250 in the buckling groove 245. The first abutting portion 2511 abuts against an inner surface of one sidewall of the fastening slot 240 and the second abutting portion 2512 abuts against the buckling element 246 to restrain the torsion spring 251 between the inner surface of the corresponding sidewall of the fastening slot 240 and the buckling element 246. The isolating piece 252 is received in the receiving space 244 with the insertion hole 2521 thereof corresponding to the second connector 23 of the power supply strap 20 to seal up the pivoting rod 250 in the fastening slot 240.

Referring to FIG. 1 to FIG. 5, when the power supply strap 20 is electrically connected with the electronic assembly 10, the first connector 16 is inserted into the second connector 23 to electrically connect with the second connector 23, the connecting block 151 of the first buckling device 15 is received in the receiving space 244 of the second buckling device 24, the torsion springs 251 are capable of rotating to drive the two buckling elements 246 to rotate downward so as to bring along the two buckling portions 248 of the two buckling elements 246 to be buckled in the two buckling holes 152, at the moment, the second battery module 22 is electrically connected with the device circuit 12, and the second battery module 22 provides the power to the electronic assembly 10 by virtue of the device circuit 12. If the power provided by the second battery module 22 is insufficient, the two base portions 247 of the two buckling elements 246 are pressed downward to make the two buckling elements 246 to rotate upward so as to bring along the two buckling portions 248 of the two buckling elements 246 to move upward and further break away from the two buckling holes 152, and the first connector 16 is withdrawn from the second connector 23, so that the power supply strap 20 breaks away from the electronic assembly 10, and another power supply strap 20 with the sufficient power is provided to electrically connect with the electronic assembly 10.

The electronic assembly 10 is charged by the way of being provided the power by the power supply strap 20, and the power supply stray 20 is capable of being detached quickly and electrically connected with the electronic assembly 10 by virtue of the first connector 16, the second connector 23, the first buckling device 15 and the second buckling device 24.

Preferably, the first connector 16 and the second connector 23 are universal serial bus (USB) connectors, and specifically, are standard universal serial bus connectors. The first connector 16 is a USB plug connector, and the second connector 23 is a USB receptacle connector. Specifically, the first connector 16 is a standard USB plug connector, and the second connector 23 is a standard USB plug connector. The electronic assembly 10 is electrically connected with a computer, a television or other electronic equipment which has a standard USB receptacle connector by virtue of the standard USB plug connector being connected with the standard USB receptacle connector so as to facilitate capturing and transmitting data of the electronic assembly 10. So the wearable electronic device 1 is capable of being charged by virtue of the first connector 16 of the electronic assembly 10 being electrically connected with the second connector 23 having the same connector type as the first connector 16. And the electronic assembly 10 is able to electrically connect with a portable power to be charged directly. In addition, the power supply strap 20 is able to be replaced by another power supply ribbon-shaped element.

As described above, the electronic assembly 10 is charged by the way of being provided the power by the power supply strap 20, and the power supply stray 20 is capable of being detached quickly and electrically connected with the electronic assembly 10 by virtue of the first connector 16, the second connector 23, the first buckling device 15 and the second buckling device 24, so that an using scope of the wearable electronic device 1 will be without limitation. The wearable electronic device 1 is capable of being charged by virtue of the first connector 16 of the electronic assembly 10 being electrically connected with the second connector 23 having the same connector type as the first connector 16. In addition, the power supply strap 20 is able to be replaced by another power supply ribbon-shaped element. Thus, the wearable electronic device 1 can not only be worn on the wrist of the person, but also be worn to any part of the human body of the person.

What is claimed is:

1. A wearable electronic device, comprising:
    an electronic assembly including a first main body, a circuit module, a first buckling device and a first connector, the circuit module being disposed inside the first main body of the electronic assembly, the first buckling device and the first connector being disposed outside the first main body of the electronic assembly and located at one end of the electronic assembly, the first connector being electrically connected with the circuit module; and
    at least one detachable power supply strap mounted to one end of the electronic assembly, the power supply strap including a second main body, a second battery module, a second connector and a second buckling device, the second battery module being disposed inside the second main body of the power supply strap, the second connector and the second buckling device being disposed to one end of the second main body of the power supply strap, the second connector being electrically connected with the second battery module and being connected with the first connector, the second buckling device being matchable with the first buckling device;
    wherein the second buckling device is buckled in the first buckling device, the first buckling device includes a connecting block which defines at least one buckling hole, the second buckling device includes a top wall which defines at least one buckling groove vertically penetrating therethrough and penetrating through an outer surface thereof, and the second buckling device further includes at least one buckling element buckled in the buckling groove, the buckling element has a base portion, and a buckling portion extended downward from one end of the base portion, the buckling portion of the second buckling device is rotatably buckled in the buckling hole of the first buckling device.

2. The wearable electronic device as claimed in claim 1, wherein two opposite sides of the connecting block of the first buckling device are concaved downward to form two buckling holes, the top wall of the second buckling device defines two buckling grooves vertically penetrating therethrough and penetrating through the outer surface thereof, and the second buckling device includes two buckling elements, the two buckling elements are buckled in the two buckling grooves, the two buckling portions of the two buckling elements of the second buckling device are rotatably buckled in the two buckling holes of the first buckling device.

3. The wearable electronic device as claimed in claim 1, wherein the second buckling device includes the top wall extended outward from a top of one end of the second main body of the power supply strap for being mounted to the electronic assembly, a bottom wall extended outward form a bottom of the end of the second main body, and two opposite side walls extended outward from two opposite sides of the end of the second main body and connected with the top wall and the bottom wall, the top wall, the bottom wall and the two side walls surround a receiving space, the connecting block of the first buckling device is received in the receiving space of the second buckling device.

4. The wearable electronic device as claimed in claim 1, wherein the buckling element of the second buckling device has a lying protruding pillar protruded downward from a bottom surface of the base portion, the protruding pillar defines a pivoting hole, the second buckling device further includes a pivoting rod and two torsion springs, a lower portion of the top wall of the second buckling device is recessed inward to form a fastening slot communicating with the buckling groove, the pivoting rod passes through the pivoting hole of the protruding pillar of the buckling element, the two torsion springs are worn around two opposite ends of the pivoting rod, the pivoting rod together with the two torsion springs is fastened to the fastening slot, and the buckling element is buckled in the buckling groove so as to make the buckling portion of the buckling element rotate pivoting the pivoting rod in the buckling groove.

5. The wearable electronic device as claimed in claim 4, wherein two opposite ends of each torsion spring respectively protrude outward to form a first abutting portion and a second abutting portion, the first abutting portion abuts against an inner surface of one sidewall of the fastening slot and the second abutting portion abuts against the buckling element to restrain the torsion spring between the inner surface of the corresponding sidewall of the fastening slot and the buckling element.

6. The wearable electronic device as claimed in claim 4, wherein the second buckling device includes the top wall, a bottom wall and the two side walls which surround a receiving space, the second buckling device further includes an isolating piece, a middle of the isolating piece defines an insertion hole, the isolating piece is received in the receiving space with the insertion hole thereof corresponding to the second connector of the power supply strap to seal up the pivoting rod in the fastening slot.

7. The wearable electronic device as claimed in claim 1, wherein the first connector is disposed to an outer surface of a free end of the connecting block of the first buckling device.

8. The wearable electronic device as claimed in claim 1, wherein the first connector is a plug connector, and the second connector is a receptacle connector.

9. The wearable electronic device as claimed in claim 8, wherein the first connector and the second connector are universal serial bus connectors.

10. The wearable electronic device as claimed in claim 9, wherein the first connector and the second connector are standard universal serial bus connectors.

11. The wearable electronic device as claimed in claim 1, wherein the wearable electronic device further includes a main strap pivotally disposed to the other end of the electronic assembly.

12. The wearable electronic device as claimed in claim 11, wherein the main strap is connected with the power supply strap by virtue of a clasp.

13. The wearable electronic device as claimed in claim 11, wherein the main strap is able to be replaced by the power supply strap.

* * * * *